May 30, 1967  R. E. GELLER  3,321,995
STEERING WHEEL ASSEMBLY
Original Filed May 18, 1964  5 Sheets-Sheet 1

INVENTOR.
RODGER E. GELLER
BY
*Albert H. Reuther*
ATTORNEY

May 30, 1967    R. E. GELLER    3,321,995
STEERING WHEEL ASSEMBLY
Original Filed May 18, 1964    5 Sheets-Sheet 4

INVENTOR.
RODGER E. GELLER
BY
ATTORNEY

May 30, 1967  R. E. GELLER  3,321,995
STEERING WHEEL ASSEMBLY
Original Filed May 18, 1964  5 Sheets-Sheet 5

INVENTOR.
RODGER E. GELLER
BY
ATTORNEY

United States Patent Office 3,321,995
Patented May 30, 1967

3,321,995
STEERING WHEEL ASSEMBLY
Rodger E. Geller, Dayton, Ohio, assignor to General Motors Corporation, Detroit, Mich., a corporation of Delaware
Original application May 18, 1964, Ser. No. 368,302, now Patent No. 3,274,851, dated Sept. 27, 1966. Divided and this application May 11, 1966, Ser. No. 549,216
1 Claim. (Cl. 74—552)

This is a division of copending application Ser. No. 368,302, Geller, filed May 18, 1964, now Patent No. 3,274,851, and belonging to the assignee of the present invention.

This invention relates to assembly of vehicle steering wheel means and, more particularly, to arrangement of components in location intermediate rim and hub portions thereof.

Use of only flexible components per se between rim and hub portions can result in problems of twist and deformation thereof under sudden tangential or axial forces which may be applied thereto. Yet a predetermined flexibility is sought for safety reasons requiring at least partial absorption of bodily impact forces. Accordingly, an object of the present invention is to provide new and improved steering wheel assembly arrangements which assure necessary rigidity yet affording predetermined peripheral resilience for shock absorption.

Another object of the present invention is to provide a steering wheel assembly between rim and hub portions including a central rigid cage having open space for instrument visibility centrally thereof anchored by hub-supported bars extending to an intermediate loop from which resilient wiring projects peripherally to the rim portion.

Another object of the present invention is to provide a steering wheel arrangement assembled between hub and rim portions thereof with tensioned wiring, clip means, expanded metal brackets and resilient lacing means located only directly radially inwardly from the rim portion to an intermediate rigid ring member for a distance less than from the hub portion to the ring member rigidly held thereby in spaced axial relation parallel to the hub portion by spider rods in diverging relation to each other to withstand sudden turning forces.

A further object of the present invention is to provide steering wheel arrangement to include a central hub portion offset axially to one side of a pair of concentric rim portions substantially co-planar as to each other and including both resilient and rigid interconnections thereto radially outwardly from the hub portion.

Another object of the present invention is to provide a steering wheel means having both hub and rim portions in combination with an auxiliary rim portion located radially therebetween and joined by both rigid support portions carried in widely spaced positioning maintained centrally by the hub portion as well as more resilient trim means relatively close together yet deflectable under impact absorbed peripherally thereby.

Further objects and advantages of the present invention will become apparent from the following description, reference being had to the accompanying drawings wherein preferred embodiments of the present invention are clearly shown.

Figure 1:
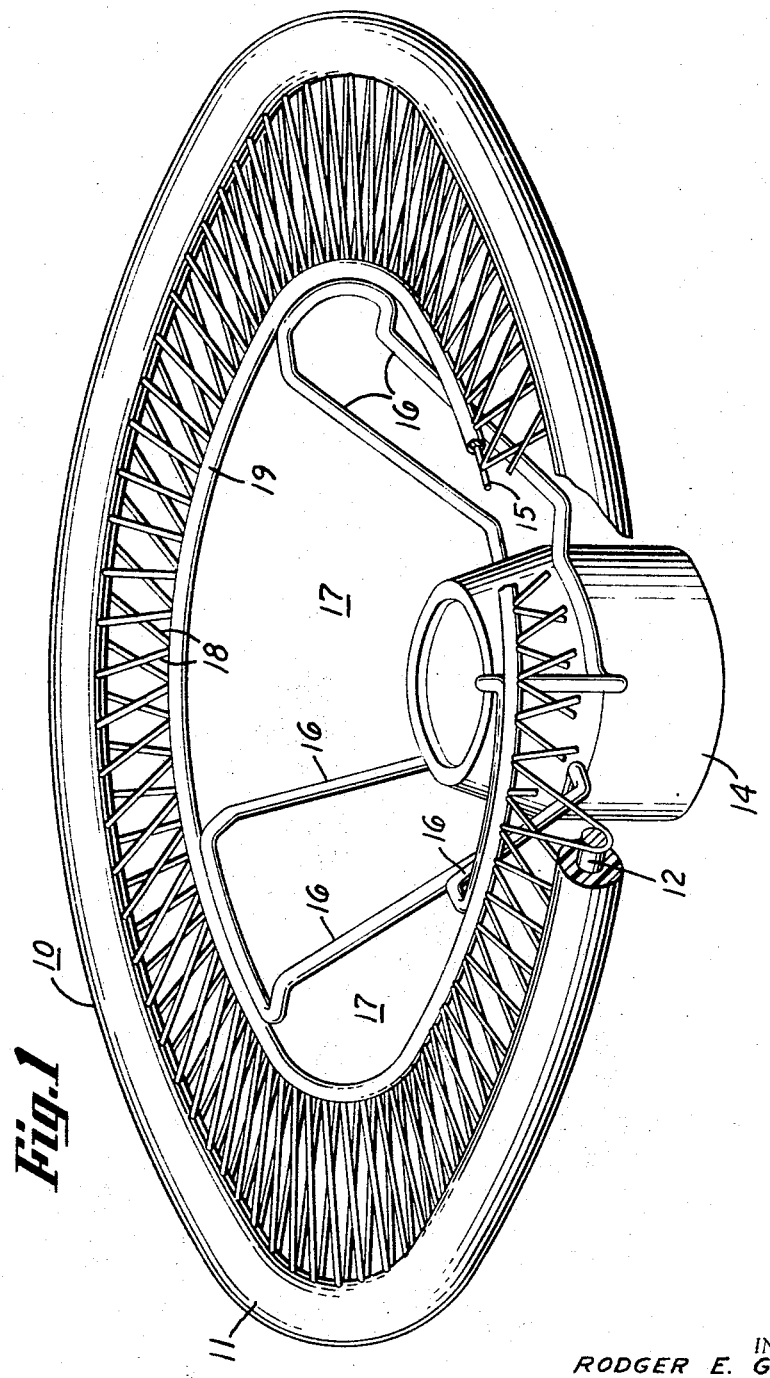
FIGURE 1 illustrates in perspective a steering wheel assembly in accordance with the present invention.

In FIGURE 1 there is a steering wheel means generally indicated by numeral 10 including a first or outer rim portion 11 having a metal core 12 therein positioned axially to one side of and radially outwardly from a central hub portion 14. Previous attempts to improve safety features of such steering wheel means have included provision of resilient spokes or interconnections for the hub and outer rim portions which in some instances can be caused to twist or deform as to each other due to sudden turning force applied to the rim portion 11 when actually no danger or impact exists so far as harm to the body of a vehicle operator is concerned. Under such circumstances it is desirable to have a differing steering wheel arrangement provided with features in accordance with the present invention. Therefore, in FIGURE 1 there is shown a combination of intermediate components including an auxiliary rim portion 15 located radially inwardly and concentrically as to the outer rim portion 11. A limited number of relatively secure and fixed spider-like rods or supports 16 form a cage with considerable open space 17 therebetween for instrument panel visibility. Criss-crossed thin wiring means 18 can be attached between the outer metal core 12 and auxiliary or inner ring member or rim portion 15. This wiring 18 could be in tension with an angular relationship of criss-crossing wiring in a range between 15 and 30 degrees. An optional covering 19 of insulating material can be provided to conceal juncture of the wiring 18 with the ring or auxiliary rim portion 15. Thus both the rim portion 11 and covering 19 can provide ornamental effect while resilient wiring 18 assures peripheral safety subject to polishing and deflashing of molded plastic or insulating materials of the rim portion 11 and covering 19 in accordance with a teaching of a U.S. Patent 3,020,661, Miller et al., issued Feb. 13, 1962 and belonging to the assignee of the present invention. Reference can also be made to a copending disclosure of S.N. 347,773, McCardle et al., filed Feb. 27, 1964, and belonging to the assignee of the present invention wherein further details as to insulation coverings and finishing thereof can be found. Such vapor finishing as disclosed in Patent 3,020,661, Miller et al., dated Feb. 13, 1962, and in the copending application permits cleaning around wiring. It is to be understood that the cross-cross of wiring 18 can be reinforced or modified as shown in other views of the drawings.

Figure 2:
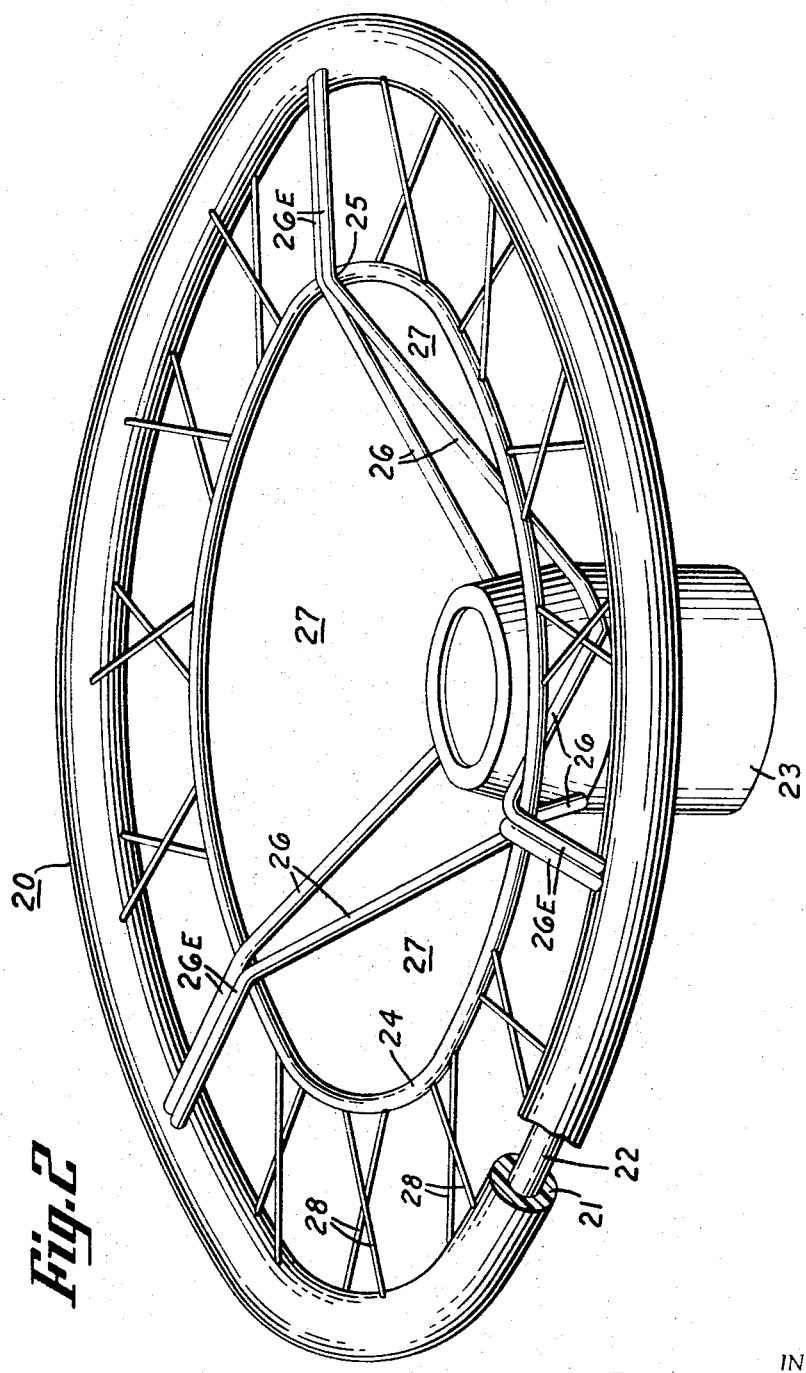
FIGURE 2 shows a perspective view of a modification of the assembly of FIGURE 1.

In FIGURE 2 there is shown another steering wheel means generally indicated by numeral 20 having a rim portion 21 of insulating material reinforced by a central core 22 located outwardly from a hub portion 23. Intermediate components in accordance with the present invention include an auxiliary ring or rim member 24 which is secured and positioned along an underside of an angular location 25 of relatively rigid rod or support means 26 having extensions 26E thereof joined to the metal core 22. In this embodiment there is still considerable open spacing 27 centrally adjacent to the hub portion 23 and the auxiliary rim or ring portion 24 though crisscross wiring 28 is reinforced by the extensions 26E. It is to be noted that the extensions 26E can be used singly or doubly as illustrated though the double use is probably more convenient.

Figure 3:
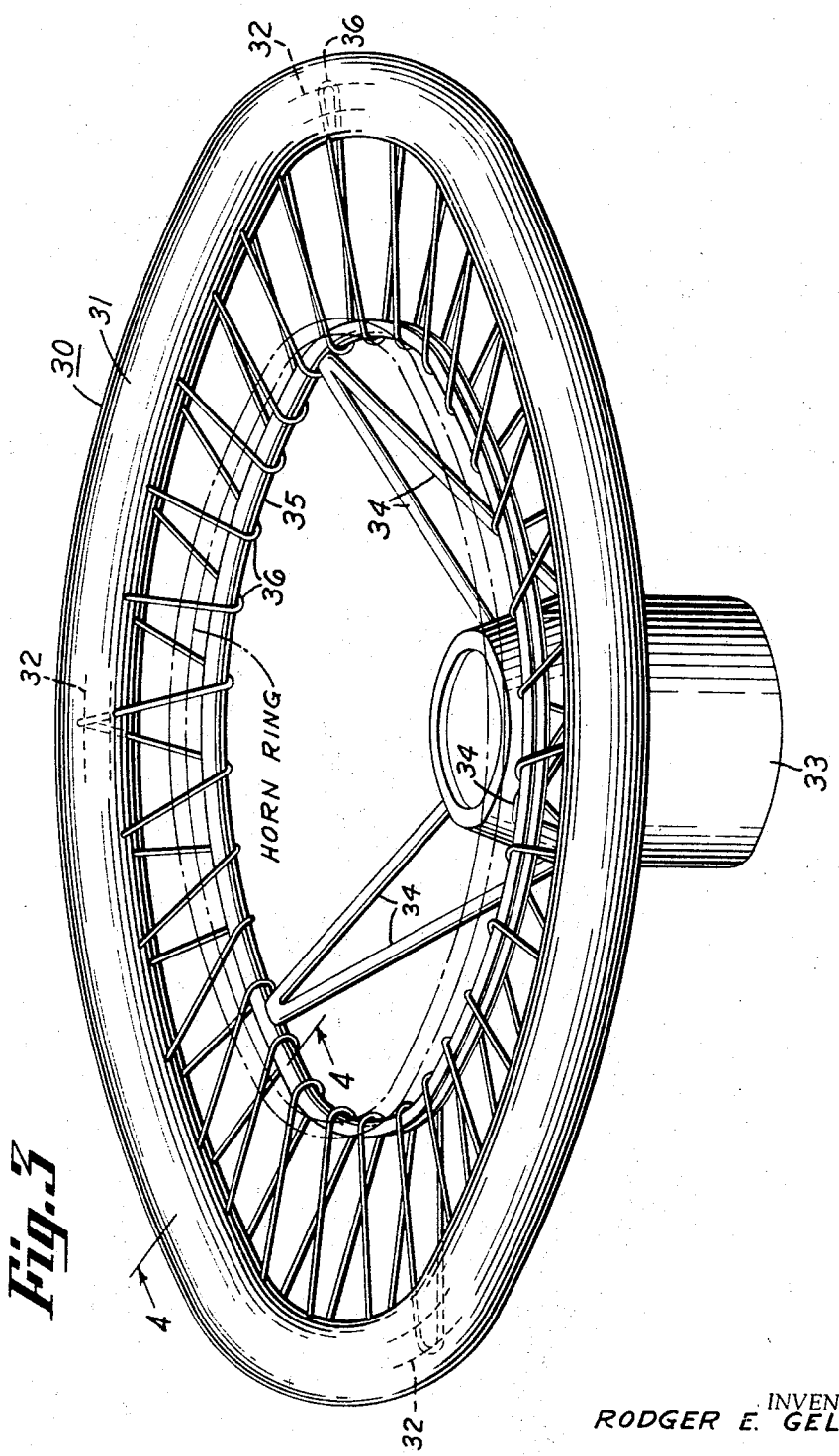
FIGURE 3 is a perspective view of steering wheel rim and hub portions having zig-zag rigid intermediate ring means substantially in alignment with horn blowing means as carried by a central hub portion and peripheral resilient wiring means.
Figure 4:
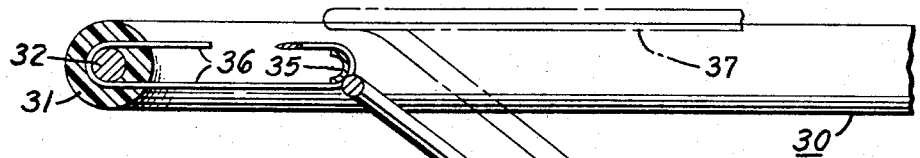
FIGURE 4 is a cross-sectional view taken along line 4—4 in FIGURE 3.

FIGURE 3 shows another steering wheel means generally indicated by numeral 30 having a rim portion 31 of insulating material on a metal core 32 as well as a central hub portion 33. A rigid cage-like central portion can include plural rods or support means 34 in a star-like configuration having outer ends thereof secured such as by brazing or welding to a ring member or auxiliary rim portion 35. Resilient thin wiring means 36 can be looped or wrapped in a zig-zag configuration radially inwardly from the metal core 32. The rod or rigid support means 34 could also be a metal stamping either perforated or solid. FIGURE 4 illustrates the dished configuration of the intermediate components between the rim portion 31 and hub portion 33. It is to be noted that in cross section the auxiliary ring or rim portion 35 could be of a size or diameter less than that of the rim portion 31 so that a horn ring 37 outlined in FIGURE 4 could be located concentrically or axially in alignment on one side of the ring or auxiliary rim portion 35.

Figure 5:
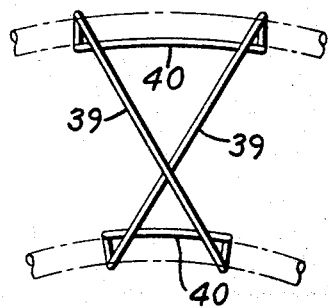
FIGURE 5 is a plan view of alternate peripheral wiring means for use in steering wheel assembly of the present invention.

In FIGURE 5 there is an alternate showing of a wiring means with crisscross portions 39 as well as bent-over ends 40 integral therewith forming a substantially figure eight configuration. Such wiring means 39 with the bent-over ends 40 would look similar to the criss-cross wiring means 18 and 28 of FIGURES 1 and 2 and could be used conveniently in predetermined locations radially inwardly from the outer rim portion to only the intermediate or auxiliary ring means such as identified by reference numerals 15, 25 and 35 in views of FIGURES 1, 2 and 3 respectively.

Figure 6:
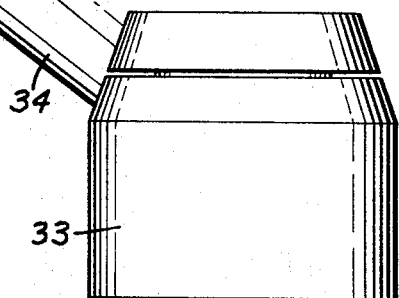
FIGURE 6 is a plan view of another resilient means of stamped metal for use in steering wheel assembly of the present invention.

FIGURE 6 shows another embodiment of intermediate components useable in place of the criss-cross wiring such as 39 and having a body portion 41 of stamped metal centrally opened as indicated at numeral 42 as well as having opposite bent-over ends 43 which fit and can be crimped over the core of the outer rim portion as well as the intermediate ring means.

Figure 7:
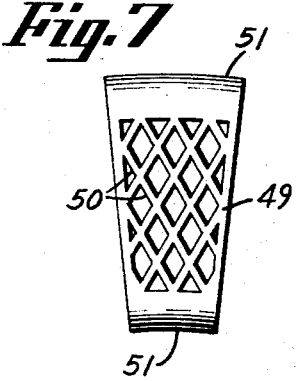
FIGURE 7 is a plan view of further resilient means of expanded metal for use in steering wheel assembly of the present invention.
Figure 8:
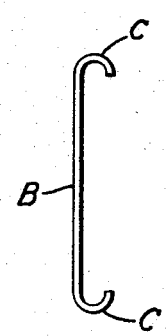
FIGURE 8 is a side view of configuration of resilient means such as shown by views of FIGURES 5, 6 and 7.

In FIGURE 7 there is an illustration of another metal stamping or expanded metal means having a central body portion 49 including a plurality of openings 50 therethrough as well as bent-over ends 51. FIGURE 8 illustrates a side or elevational view of the structures of FIGURE 5, 6 and 7 arbitrarily identified by a reference B representing the body portions 39, 41 and 51 respectively as well as the crimped or curled ends identified by a reference numeral C in FIGURE 8 corresponding to the ends 40, 43 and 51 in FIGURES 5, 6 and 7 respectively. It is to be understood that by curling or crimping over the ends as to the core of the outer rim portion and the intermediate ring means each of the body portions is caused to be in tension. Each of the body portions is to be located substantially in a horizontal plane intermediate the core of the outer rim portion and the intermediate ring means.

It is to be noted that the intermediate ring means such as represented by reference numerals 15, 25 and 35 in views of FIGURES 1, 2 and 3 could have a semi-arcuate cross section or rolled channel metal such that wiring can terminate at radially inner ends thereof with enlarged head portions as to the intermediate ring means.

Figure 9:
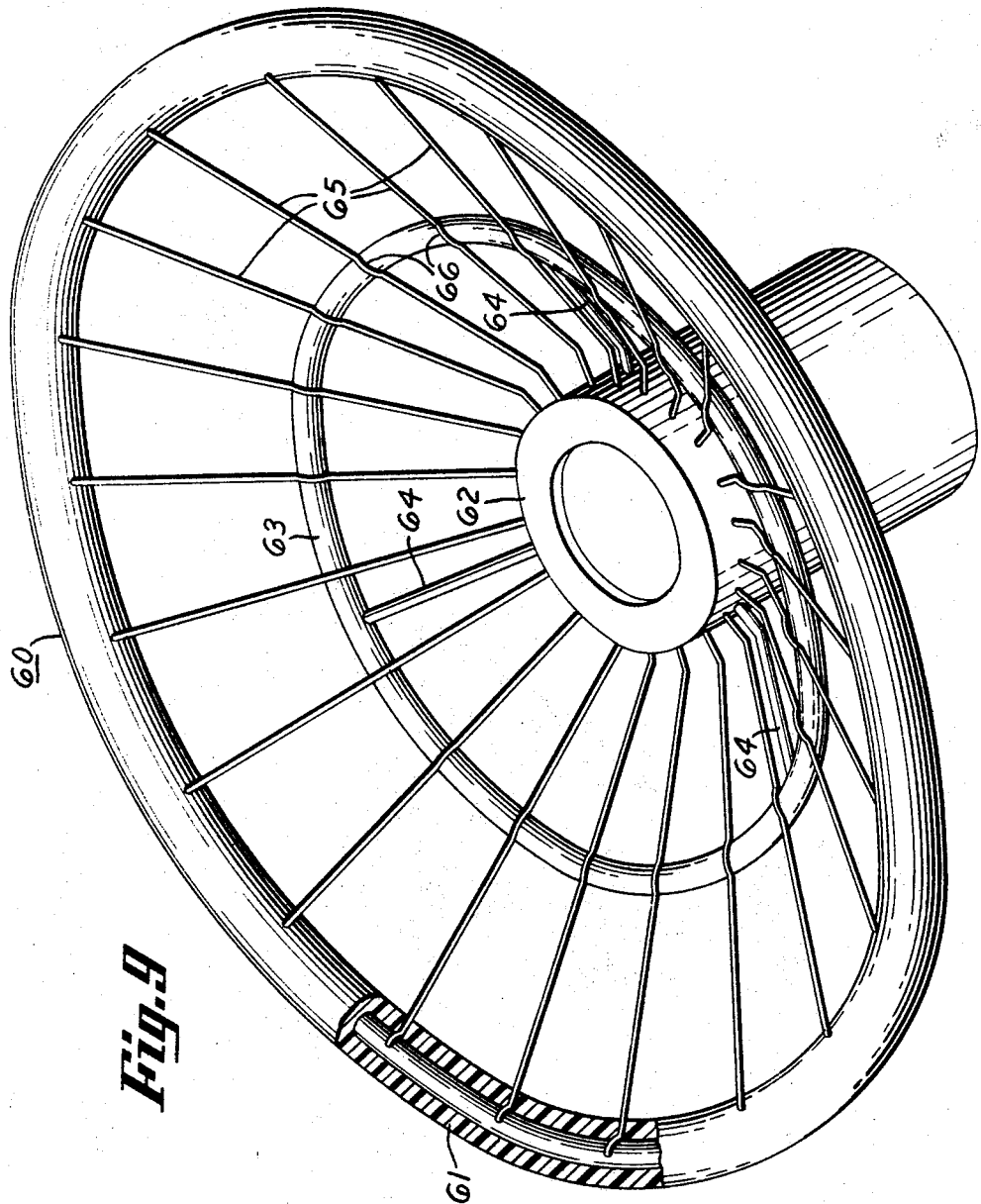
FIGURE 9 is a perspective view of another steering wheel modification.

In FIGURES 9 there is shown another steering wheel arrangement generally indicated by numeral 60 including an outer rim portion 61 as well as a central hub portion 62. Extending radially outwardly and axially to one side of the hub portion 62 there is a cage means or intermediate ring member 63 rigidly supported as to the hub portion by rods 64. However, the rods 64 are relatively few in number compared with a plurality of radially extending resilient and thin-wire means 65 which can be joined or deformed at an intermediate location 66 as to the ring means 63. Outer ends of the wiring 65 can be suitably secured to the outer rim portion 61. Reference can be made to a copending application S.N. 318,-207, Geller, filed Oct. 23, 1963, now Patent No. 3,270,581, and belonging to the assignee of the present invention concerning differing steering wheel means. Also reference can be made to copending design applications S.N. 77,115, Geller, filed Oct. 23, 1963, now Patent Des. 200,-636, Geller issued Mar. 23, 1965, and S.N. 77,116, Geller, filed Oct. 23, 1963, now Patent Des. 202,495, Geller, issued Oct. 12, 1965, including divisions thereof respectively, as well as another design application, S.N. 80,029, Geller, filed concurrently with the parent hereof on May 18, 1964, and now Patent Des. 203,449, Geller, issued Jan. 18, 1966, including divisions thereof also.

While the embodiments of the invention as herein disclosed constitute preferred forms, it is to be understood that other forms might be adopted.

What is claimed is as follows:

A steering wheel comprising, an outer rim, a center hub, an intermediate ring concentric to both said outer rim and center hub and substantially co-planar with said outer rim, at least two pairs of first spoke means rigidly secured to and angularly disposed relative to the planes of said center hub and said intermediate ring and second spoke means comprising a plurality of wire pairs lying in respective planes substantially parallel to the plane of said outer rim and intermediate ring interconnecting said outer rim and intermediate ring for resiliently supporting said outer rim.

References Cited

UNITED STATES PATENTS

| D. 139,508 | 11/1944 | Snow | 74—552 X |
| 436,993 | 9/1890 | Overman | 301—55 X |
| 441,409 | 11/1890 | Hardy. | |
| 2,765,674 | 10/1956 | Robards | 74—552 |
| 3,020,661 | 2/1962 | Miller et al. | 264—341 |
| 3,055,231 | 9/1962 | Daniel | 74—552 |

MILTON KAUFMAN, *Primary Examiner.*